US006323839B1

(12) United States Patent
Fukuda et al.

(10) Patent No.: US 6,323,839 B1
(45) Date of Patent: *Nov. 27, 2001

(54) POINTED-POSITION DETECTING APPARATUS AND METHOD

(75) Inventors: Ryoji Fukuda, Yokohama; Kazutoshi Shimada, Yokosuka; Eisaku Tatsumi, Kawasaki; Shigeki Mori, Koshigaya; Kazuhiro Matsubayashi, Yokohama; Shinichi Sunakawa, Kawasaki; Takashi Harada, Yokohama; Katsuhiko Nagasaki, Ichikawa, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/968,794

(22) Filed: Nov. 6, 1997

Related U.S. Application Data

(63) Continuation of application No. 08/575,576, filed on Dec. 20, 1995, now abandoned.

(30) Foreign Application Priority Data

Dec. 22, 1994 (JP) .................................................. 6-320946

(51) Int. Cl.[7] ...................................................... G09G 5/08
(52) U.S. Cl. ............................................. 345/157; 345/9
(58) Field of Search ................................ 345/9, 156, 157, 345/158, 180, 87, 207, 173; 348/744, 747

(56) References Cited

U.S. PATENT DOCUMENTS

| 5,115,230 | * | 5/1992 | Smoot | 345/157 |
| 5,138,304 | | 8/1992 | Bronson | 340/707 |
| 5,502,459 | * | 3/1996 | Marshall et al. | 345/158 |
| 5,504,501 | * | 4/1996 | Hauck et al. | 345/158 |
| 5,515,079 | * | 5/1996 | Hauck | 345/157 |
| 5,936,614 | * | 8/1999 | An et al. | 345/173 |

FOREIGN PATENT DOCUMENTS

| 0535988 | 4/1993 | (EP) | G06F/15/74 |
| 0613079 | 8/1994 | (EP) | G06F/3/00 |

* cited by examiner

Primary Examiner—Bipin Shalwala
Assistant Examiner—David L Lewis
(74) Attorney, Agent, or Firm—Fitzpatrick, Cella, Harper & Scinto

(57) ABSTRACT

A pointed-position detecting apparatus where image output unit visually displays an image, and image input unit inputs the displayed visible image. The input visible image is stored into memory as an original image. The visible image is partially changed by using a manipulation device such as a laser pointer or a pointing rod, and the visible image with the partially-changed area is inputted from the image input unit. Controller extract the changed image area from the input visible image, and detects a pointed position based on the changed image area. Thus, the phenomenon where a user's action with respect to a displayed image is reflected as a change in the image is utilized to detect coordinates and motion at the image area as the object of change.

20 Claims, 15 Drawing Sheets

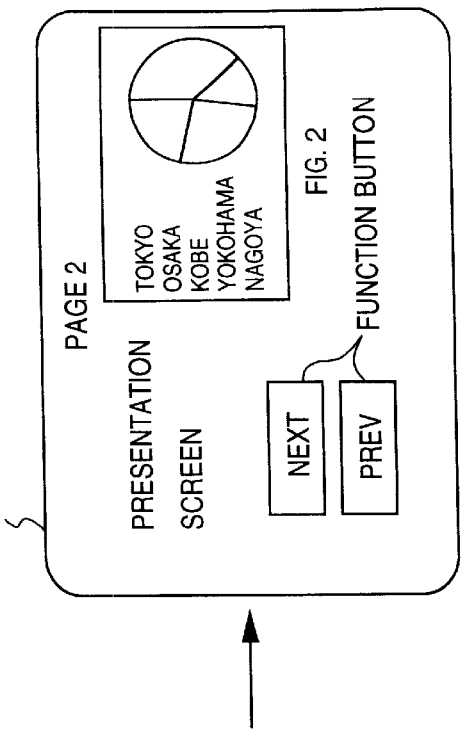
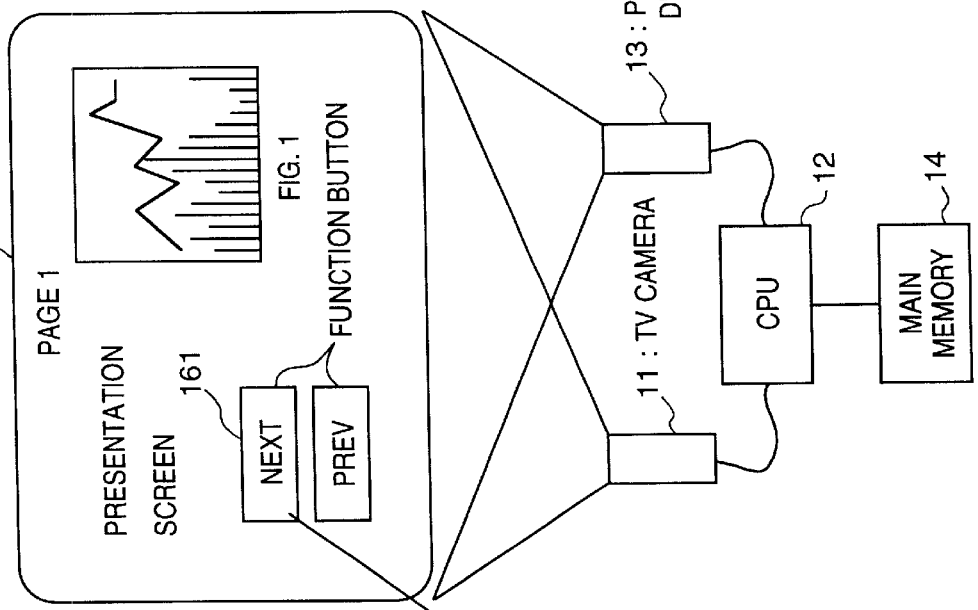
FIG. 3

FIG. 4

| PAGE | LABEL | BUTTON AREA | FUNCTION |
|---|---|---|---|
| 1 | NEXT | (100,50)-(120,60) | PageNext |
| 1 | PREV | (100,70)-(120,80) | PagePrev |
| 2 | NEXT | (80,90)-(100,100) | PageNext |
| 2 | PREV | (80,110)-(100,120) | PagePrev |
| 3 | QUIT | (300,10)-(320,20) | Quit |

US 6,323,839 B1

POINTED-POSITION DETECTING APPARATUS AND METHOD

This application is a continuation of application Ser. No. 08/575,576 filed Dec. 20, 1995, now abandoned.

BACKGROUND OF THE INVENTION

This invention relates to a pointed-position detecting apparatus and method for detecting a position in a displayed image designated by a user.

A known system for presentation or the like uses a digitizer as a projection board on which an image is projected. Specifically, an image is projected on a large-sized digitizer and a pointing rod is directly brought close to or into contact with the projected image (i.e., coordinate input surface of the digitizer). Then, the coordinates designated by the digitizer are read and the designation is reflected at the projector.

However, the above conventional art has the following problems:

(1) The digitizer (tablet) used as a screen for projecting images must have a large size. This lowers movability.

(2) The digitizer itself requires a detection mechanism such as a electromagnetic induction detector and a pressure detector. This cannot produce a large-sized digitizer with low cost.

(3) The size of projection surface is determined by the size of the digitizer. This cannot install the projector corresponding to the scale of presentation place, and it is unpractical.

SUMMARY OF THE INVENTION

The present invention has been made in consideration of the above problems and has its object to provide a pointed-position detecting apparatus and method which does not use a digitizer (tablet) as a screen, thus provides movability, though applicable to a large-sized screen.

Another object of the present invention is to provide a pointed-position detecting apparatus and method which does not require a screen having a special detection function, though which is applicable to a large sized projection surface, thus lowers cost.

Further object of the present invention is to provide a pointed-position detecting apparatus and method which can easily change the size of projection surface in accordance with the scale of presentation place.

Still another object of the present invention is to provide a pointed-position detecting apparatus and method which judges designation by a user based on status and position of a part of visible image that the user has changed by using a laser pointer, or pointing rod or the like, and reflects the user's intention.

According to the present invention, the foregoing object is attained by providing a pointed-position detecting apparatus comprising input means for inputting a visible image, first detection means for detecting a changed image area, where the visible image has changed, in the visible image inputted by the input means, and second detection means for detecting a designation position in the visible image, based on a position of the changed image area detected by the first detection means.

In accordance with the present invention as described above, a visible image is inputted. Further, the visible image is partially changed by using a laser pointer, a pointing rod or the like, and the partially-changed image is also inputted. The changed part is extracted and a designated position is detected based on the extracted part. In this manner, a phenomenon that motion by a user in a visible image appears as a change of visible image is utilized for detecting coordinates or motion of the part as the object of the change.

Preferably, the present invention provides a pointed-position detecting apparatus further comprising display means for displaying the visible image.

Preferably, the display means performs projection type image display because magnification of visible image is possible, and because the size of display screen can be easily changed in accordance with a place where the apparatus is operated.

Preferably, the first detection means detects visible light added to the visible image displayed by said display means, because the visible image can be easily changed by using a laser pointer or the like, and because designation in the visible image can be made from a position distant from the display screen.

Preferably, the second detection means detects approximately the central position of the visible light added by the first detection means to the visible image, as the designation position.

Preferably, the first detection means detects the part of the visible image changed by pointing a desired portion of the visible image with a pointing rod, because designation in the visible image can be easily made by using the pointing rod instead of a specific device such as a laser pointer.

Preferably, the second detection means detects the tip of the pointing rod image added to the visible image detected by the first detection means, as the designation position, because the designation position can be more exactly detected by detecting the tip of the pointing rod.

Preferably, the present invention provides the pointed-position detecting apparatus further comprising judgment means for judging existence/absence of operation designation, based on whether or not the changed image area detected by the first detection means in the visible image has further changed. For example, when a part of visible image is changed by adding visible light to the visible image or using a pointing rod, whether or not the change has been a user's intended operation designation can be easily judged. This improves operability.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is an explanatory view of operation example of the first embodiment;

FIG. 4 is an example of data construction of a function table defining function buttons on a projected image;

DETAILED DESCRIPTION OF THE PREFERRED EMBODIMENTS

Preferred embodiments of the present invention will now be described in detail in accordance with the accompanying drawings.

[First Embodiment]

Figure 1:
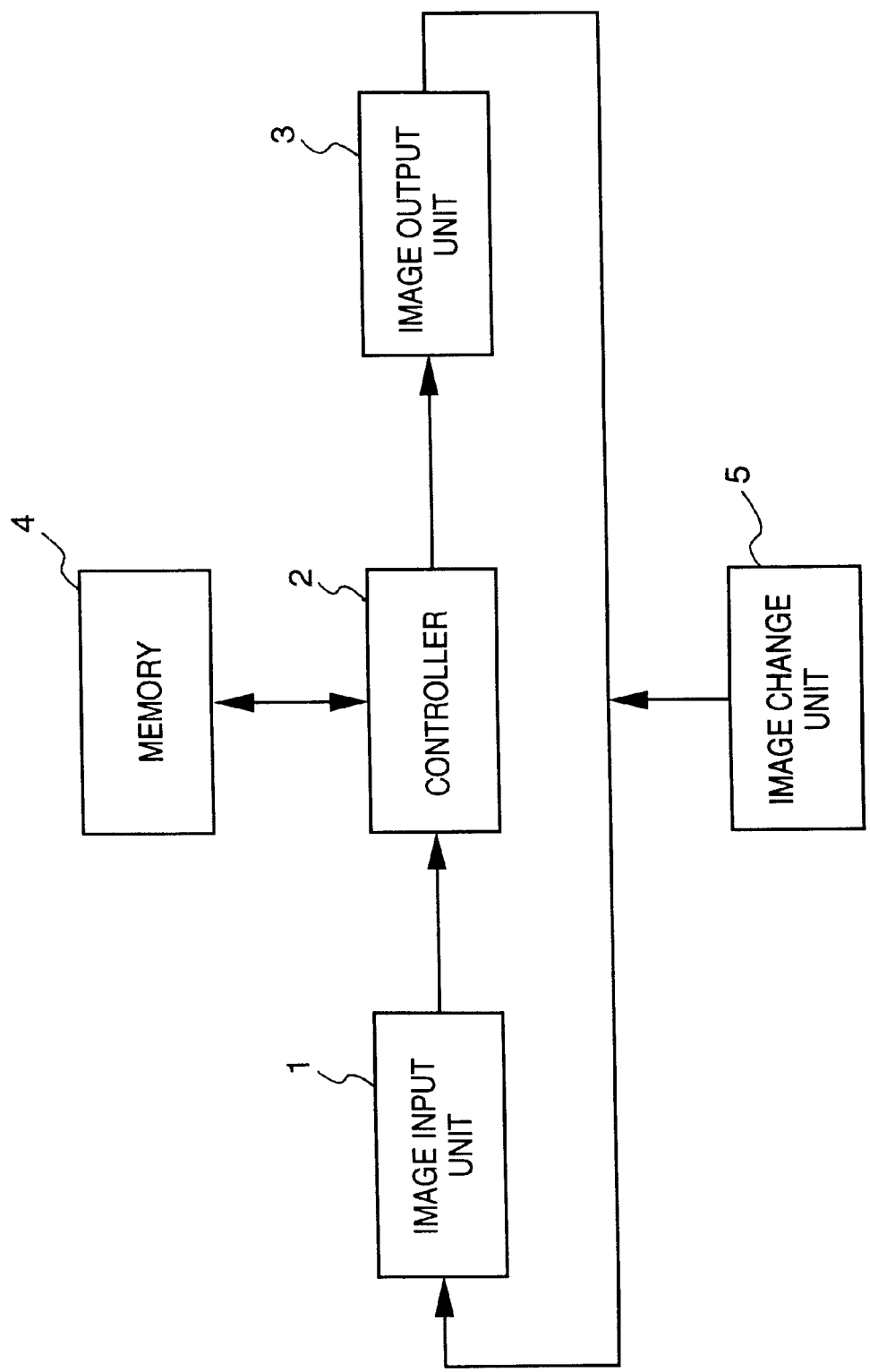
FIG. 1 is a block diagram showing the functional construction of a digitizer according to a first embodiment of the present invention.

FIG. 1 shows the functional construction of a digitizer as a pointed-position detecting apparatus according to a first embodiment of the present invention. In FIG. 1, reference numeral 1 denotes an image input unit; 2, a controller; 3, an image output unit; 4, a memory; and 5, an image change unit.

The controller 2 obtains an image from the memory 4 and outputs the image to the image output unit 3. Further, the controller 2 stores an image obtained from the image input unit 1 into the memory 4. The image outputted from the image output unit 3 is partially changed by the image change unit 5, and inputted into the image input unit 1. The controller 2 detects a change in the image by comparing the input image with the image stored in the memory 4. Then the controller 2 controls the memory 4 and the image output unit 3 in accordance with the detected change. Since image input is continued till the image input unit 1 stops its operation, continuous motion can be detected.

In addition, since it is possible to have visible object(s) such as a man (presenter), an object, a light beam and the like between the output image and input image, control based on detection of motion, which has conventionally never been considered, is possible.

Moreover, it will be possible in the future to realize natural direct dialog between a machine and a user via images, by comprising means for recognizing the user and the user's motion and means for recognizing speech.

Figure 2:
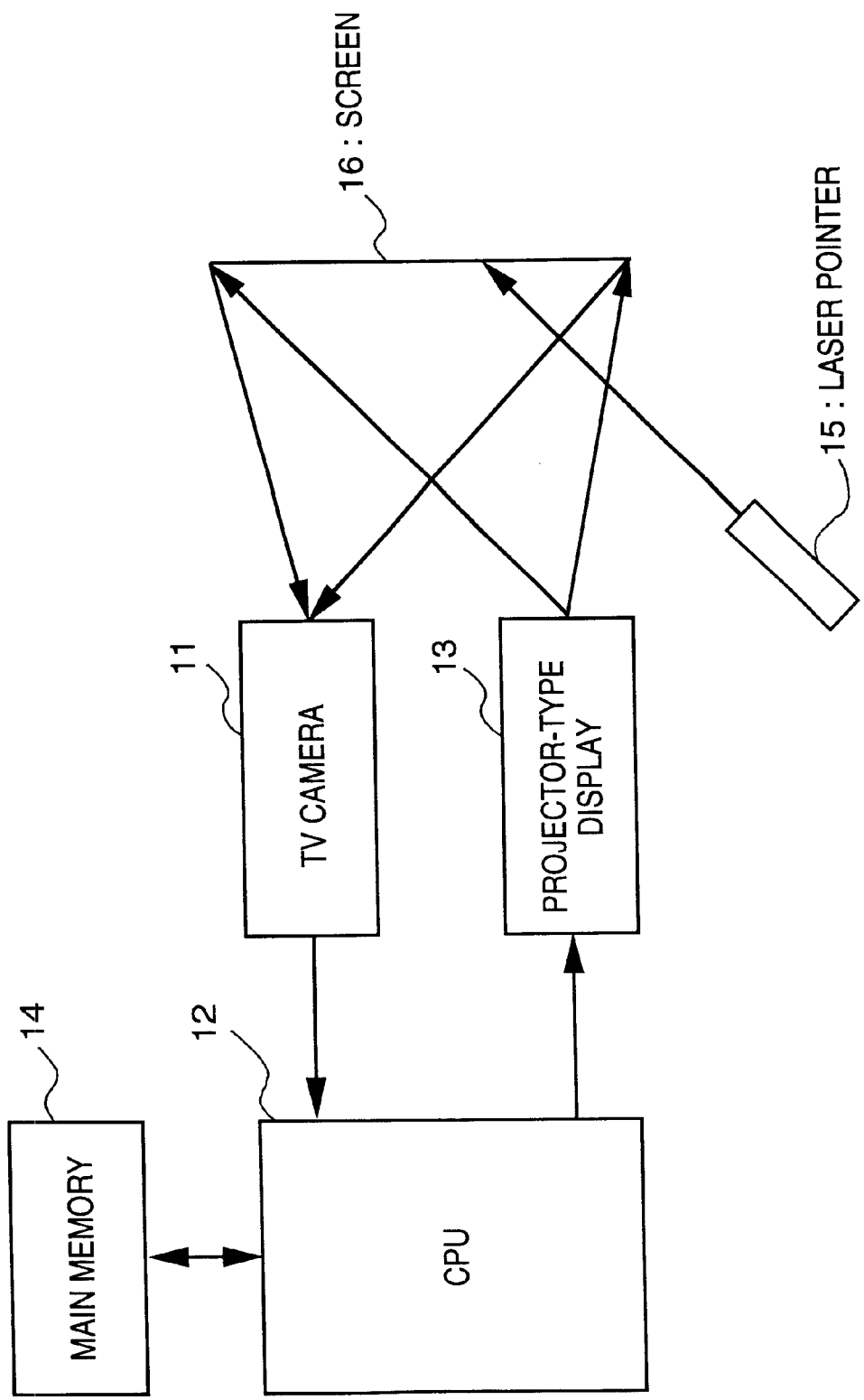
FIG. 2 is a block diagram showing the construction of the digitizer of the first embodiment.

FIG. 2 shows the construction of the digitizer of the first embodiment. Numeral 11 denotes an image sensing device such as TV camera or still video camera which functions as the image input unit 1. In this embodiment, TV camera is used for explanation. 12, a CPU which executes various controls in the digitizer; 13, a projector-type display which functions as the image output unit 3; and 14, a main memory in which an image outputted from the projector-type display 13 and various control programs for the CPU 12 are stored. A control program for performing control to be described later in accordance with the flowcharts is also stored in the main memory 14. Numeral 15 denotes a laser pointer which partially changes an image projected by the projector-type display 13 on a screen 16, by irradiating a laser beam on the screen 16. Numeral 16 denotes a screen on which images are projected.

FIG. 3 shows an example of operation of the present embodiment. In FIG. 3, the displayed page of a sample is changed to the next page.

This example is presentation in e.g. an event or a meeting of an academic society. A presenter 30 has stored references and the like into the main memory 14 in advance. Upon representation, the CPU 12 controls the projector-type display 13 to project one of the images of the stored references on the screen 16. The presenter 30 makes an explanation about the projected image (reference). The projected image is immediately stored into the main memory 14 via the TV camera 11 under the control of the CPU 12. In the progress of presentation, the reference image partially changes as the presenter 30 manipulates the laser pointer 15 to irradiate a laser beam onto the screen 16, and the TV camera 11 inputs the changed image. The CPU 12 detects the change of the image by comparing the image previously stored in the main memory 14 with the image inputted from the TV camera 11, and performs control based on the detection result.

For example, the presenter 30 irradiates the laser beam from the laser pointer 15 to a function button 161 with a label "NEXT" in the projected image "PAGE 1", then turns on and off laser light on the function button 161 (otherwise changes the color of the laser light). At light-on&off detection routine (or color-change detection routine) to be described later, a position (coordinate) where the laser light has started going on and off (otherwise the color of the laser light has changed) is detected, a function table as shown in FIG. 4 is referred to, and which button includes the coordinates of the laser-pointed position is retrieved. In this example, the button "NEXT" of the image "PAGE 1" is retrieved, so that a function "PageNext" is read, then the display is changed over the next page image. FIG. 4 shows an example of data structure of the function table defining the above function buttons. The function table is stored in the main memory 14 in correspondence with the respective projection images.

Next, processing according to the present embodiment to realize the above operation will be described below. FIGS. 5 to 13 are flowcharts showing processing procedure for detecting a position of a changed image portion. Note that prior to execution of the processing shown in FIG. 5 (e.g., upon activating the present system), shift between an input-coordinate system and an output-coordinate system is corrected. That is, an angle, distance, magnification ratio etc. of the TV camera are adjusted, and the whole display area of the projector-type display 13 is set to input-acceptable. As each apparatus has a predetermined resolution and the number of pixels, the shift between the input-coordinate system and the output-coordinate system is obtained as magnification coefficients in X-and Y-axial directions, and these are multiplied by coordinate values of the function table in FIG. 4.

Figure 16C:
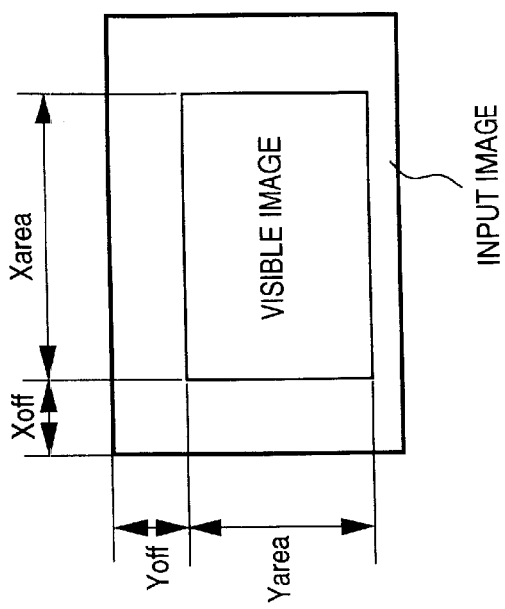
FIGS. 16A to 16C are explanatory views showing relation between a visible image on the screen and an input image inputted by a TV camera.
Figure 16B:
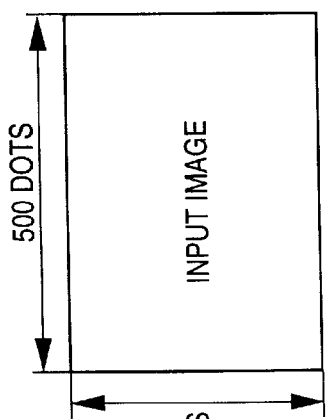
Figure 16A:
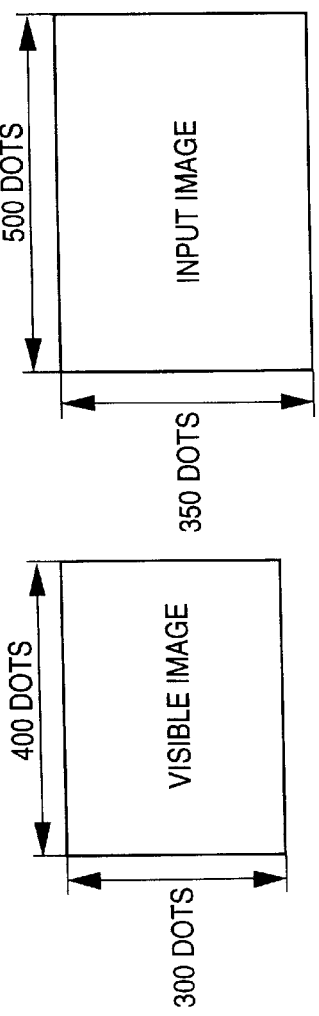

For example, a 300×400 pixel image data is displayed as a visible image on the screen 16 by the projector-type display 13 (see FIG. 16A), and the displayed image is inputted by the TV camera 11 having 350×500 pixel resolution (see FIG. 16B). In this construction, when the visible image displayed on the screen 16 is inputted into the whole image frame of the TV camera 11, the magnification coefficients are 300/350 in the vertical direction and 400/500 in the horizontal direction. Further, as shown in FIG. 16C, when the visible image displayed on the screen 16 is inputted within a range (size of Yarea pixels×Xarea pixels) smaller than the image frame of the TV camera 11, the magnification coefficients are 300/Yarea in the vertical direction and 400/Xarea in the horizontal direction. In this case, as the original point of the visible image does not coincide with that of the input image, the shift amount between the original points must be added to the coordinate values of the function table. In FIG. 16C, YOFF pixels in the vertical direction and XOFF pixels in the horizontal direction are added to the coordinate values of the function table.

Figure 5:
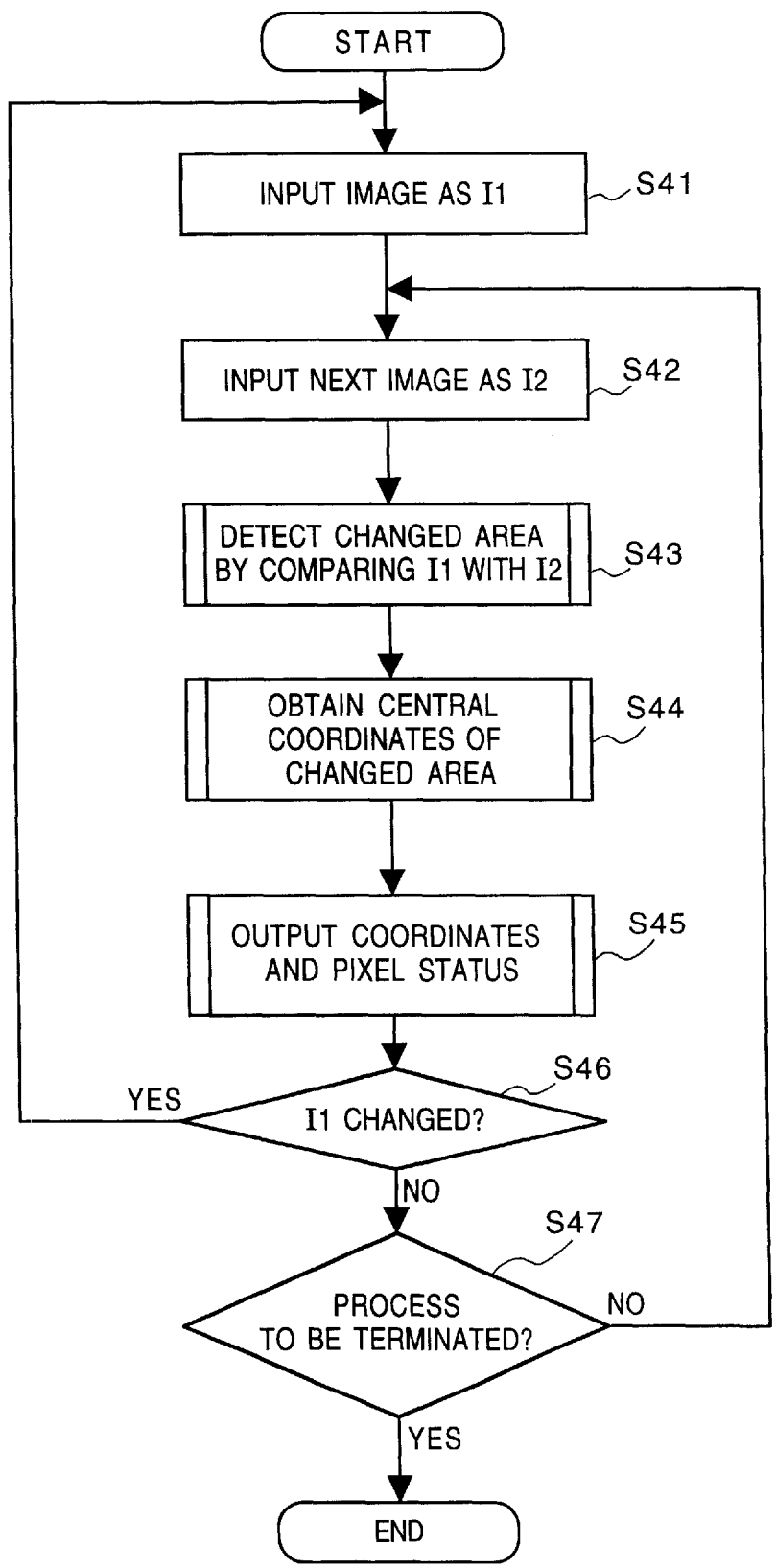
FIG. 5 is a flowchart showing coordinate detection processing according to the first embodiment.

FIG. 5 shows a main routine in the processing for detecting the coordinates of changed image portion. At step S41, an image projected on the screen 16 is inputted from the TV camera 11 as an image I1. Next, another image is inputted from the TV camera 11, after the image I1 has been inputted as an image I2. At step S43, a subroutine for comparing the image I1 with the image I2 is read, and an image area where the image has partially changed is detected. At step S44, a subroutine for detecting the central position of the detected image area is read, and the central coordinates of the changed image area is obtained. Further, at step S45, the obtained coordinates are forwarded to a color-change (or light-on&off) detection routine (to be described with reference to FIG. 12 or 13), where a designated function is executed.

In operation to change a displayed reference image (e.g., changeover to the next page), if the initial image I1 is replaced with another image, the process returns from step S46 to S41, at which the other image displayed after the image I1 is inputted as the initial image I1. At step S47, when termination operation is made by a user otherwise when a trouble occurs due to an error or the like, whether or not the processing should be terminated is determined. If NO, the process returns to step S42, to input the next image, and the above processing is repeated.

Figure 6:
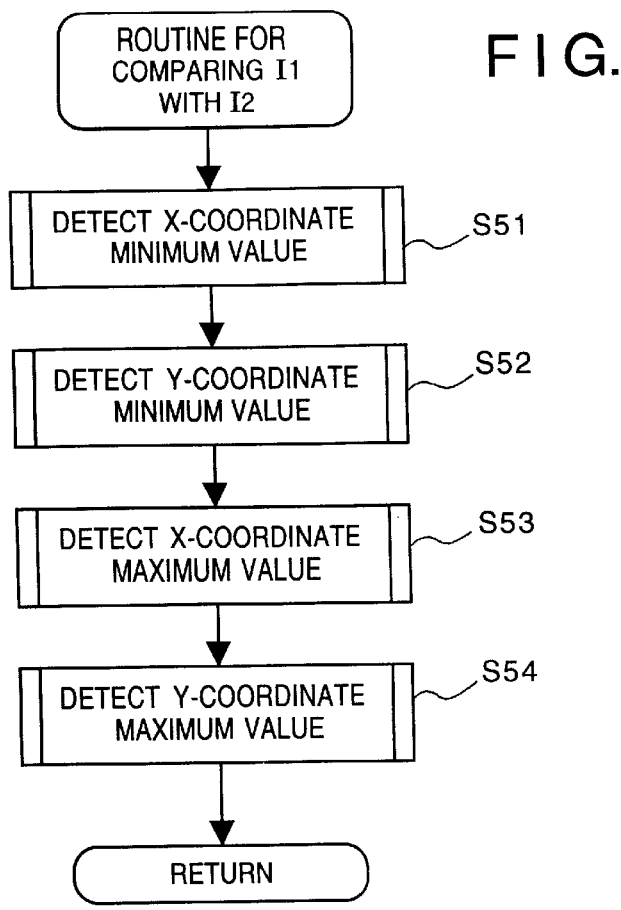
FIG. 6 is a flowchart showing a processing procedure for comparing image I1 with image I2 and detecting a changed image area.

FIG. 6 shows the subroutine for comparing the image I1 with the image I2 to detect an X-coordinate minimum value, an X-coordinate maximum value, a Y-coordinate minimum value and a Y-coordinate maximum value of the image area different between the two images. That is, this flowchart shows the subroutine called at step S43. At step S51, a subroutine (FIG. 8) for detecting the X-coordinate minimum value is called; at step S52, a subroutine (FIG. 9) for detecting the Y-coordinate minimum value is called; at step S53, a subroutine (FIG. 10) for detecting the X-coordinate maximum value is called; and at step S54, a subroutine for detecting the Y-coordinate maximum value is called. Since the subroutines are similar to each other, though they are different as to X/Y coordinate and maximum/minimum value, only the subroutine (FIG. 8) for detecting the X-coordinate minimum value will be described.

Figure 8:
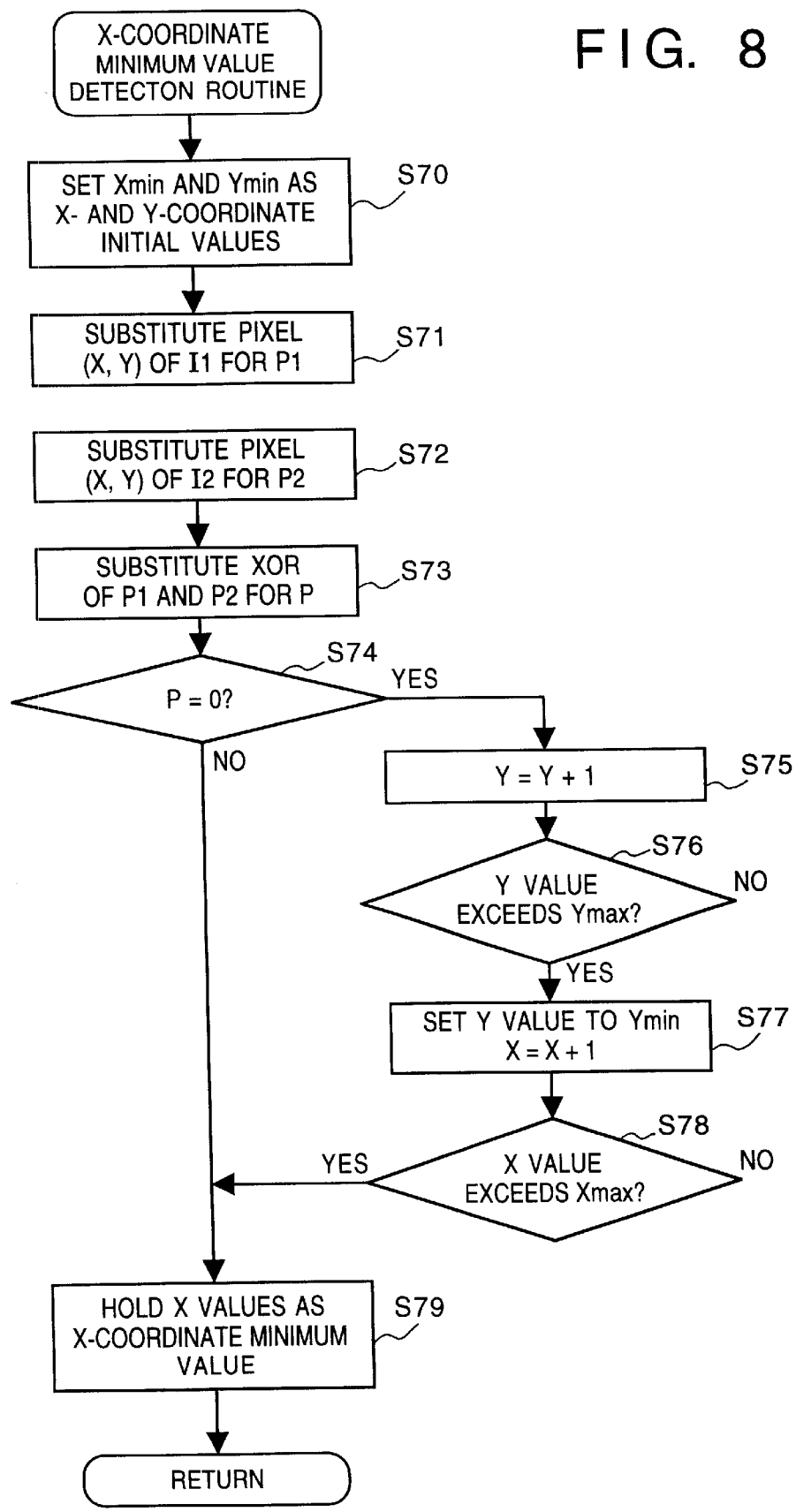
FIG. 8 is a flowchart showing a processing procedure for detecting an X-coordinate minimum value.

FIG. 8 shows the subroutine for obtaining the X-coordinate minimum value. Note that in the following explanation about the flowchart of FIG. 8, "Xmin" and "Ymin" denote minimum coordinate values in an input image. Normally, these values are automatically determined upon inputting the initial image I1 from the image input unit 1 unless trimming (area designation by a user) or the like is performed. Also, "Xmax" and "Ymax" are automatically determined upon inputting the image I1. That is, "Xmax" and "Ymax" are similar to "Xmin" and "Ymin" so far as they are maximum values.

At step S70, the above-mentioned Xmin and Ymin values are used to set initial X- and Y-values. At step S71, the pixel value at the coordinates (X, Y) of the image I1 is substituted for P1. At step S72, the pixel value at the coordinates (X, Y) of the image I2 is substituted for P2. At step S73, the values P1 and P2 are compared, and the comparison result is substituted for P. In comparison, exclusive logical OR (XOR) is used. At step S74, the comparison result is judged. Specifically, if P=0, i.e., the pixel values P1 and P2 are equal to each other, the process proceeds to step S75 to examine the next pixel. On the other hand, if P≠0, i.e., the pixel values P1 and P2 are different, the process proceeds to step S79. At step S79, the X value at this time is held as an X-coordinate minimum value, and then the process ends.

Upon examining the next pixel, the Y-coordinate value is incremented by one (Y+1) at step S75, then whether or not the Y-coordinate value exceeds a range of the image to be examined is judged, and if No, the process returns to step S71. If YES, i.e., the Y-coordinate value exceeds the range (Ymax), the process advances to step S77, at which the Y-coordinate value is set to the initial value (Ymin), and the X-coordinate value is incremented by one (X+1). At step S78, whether or not the X-coordinate value exceeds the range of the image is judged, and if NO, the process returns to step S71. If the X-coordinate value exceeds the range (Xmax), the process advances to step S79, at which the X-coordinate value is held as the initial value (Xmin), and the process ends.

Figure 9:
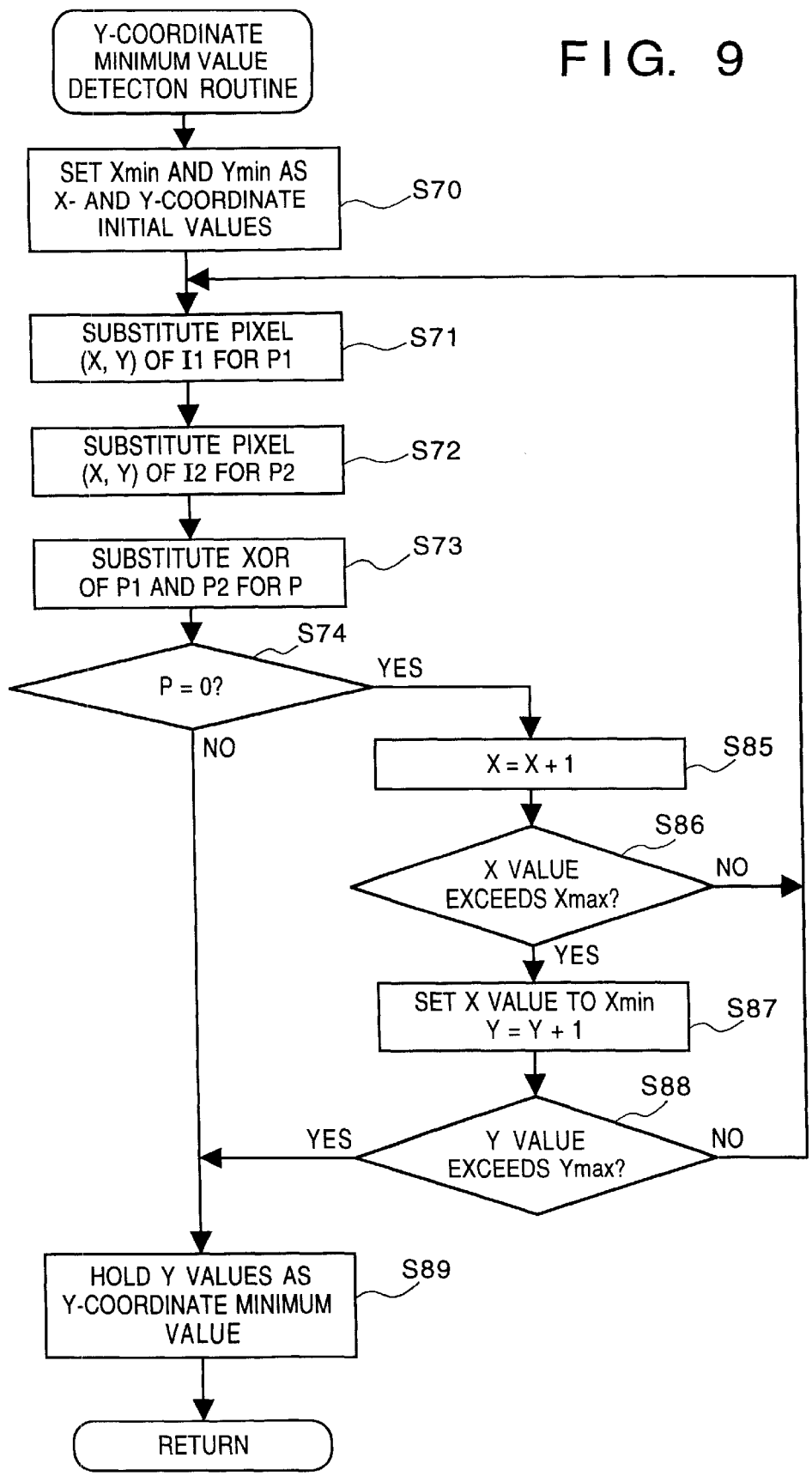
FIG. 9 is a flowchart showing a processing procedure for detecting a Y-coordinate minimum value.
Figure 10:
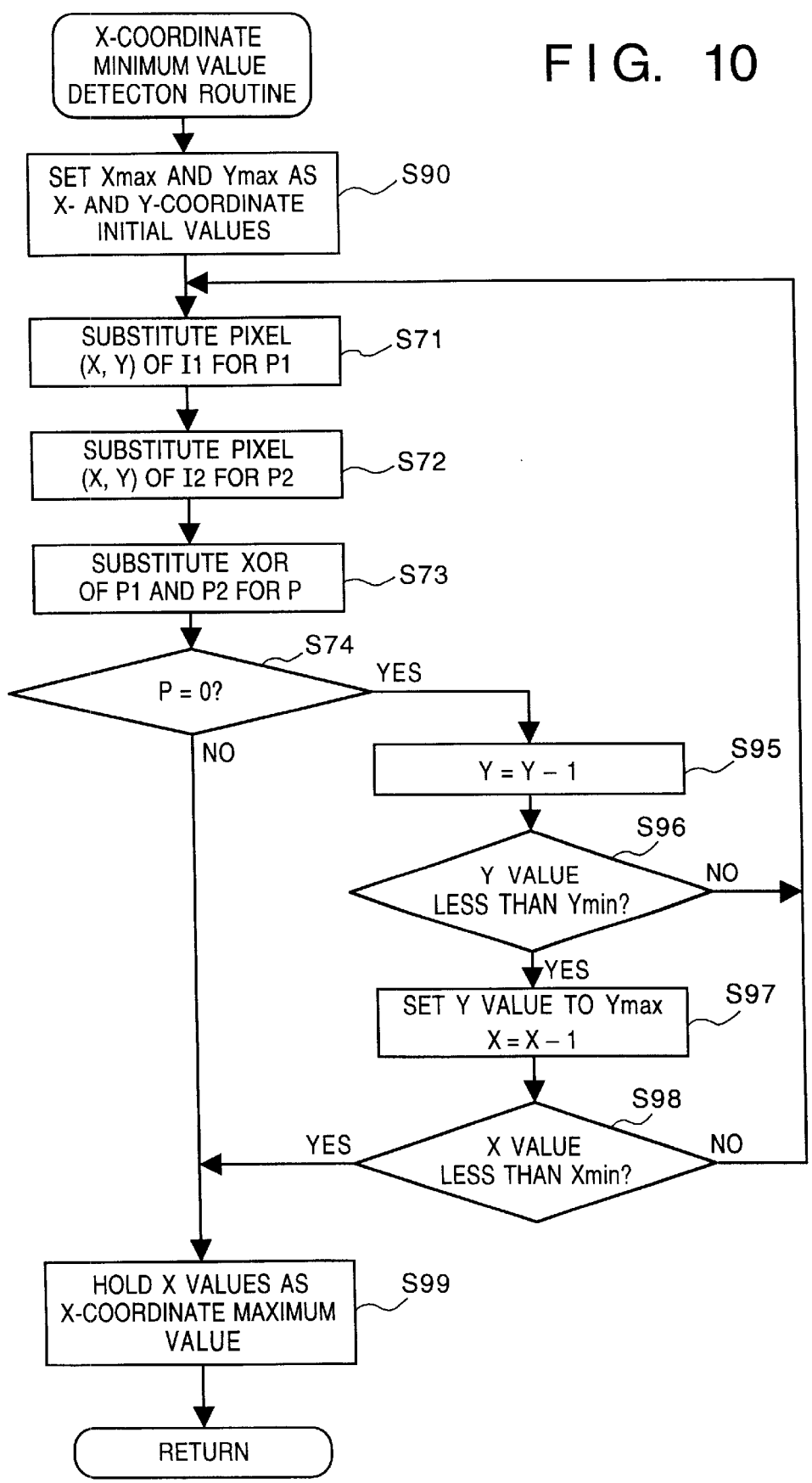
FIG. 10 is a flowchart showing a processing procedure for detecting an X-coordinate maximum value.
Figure 11:
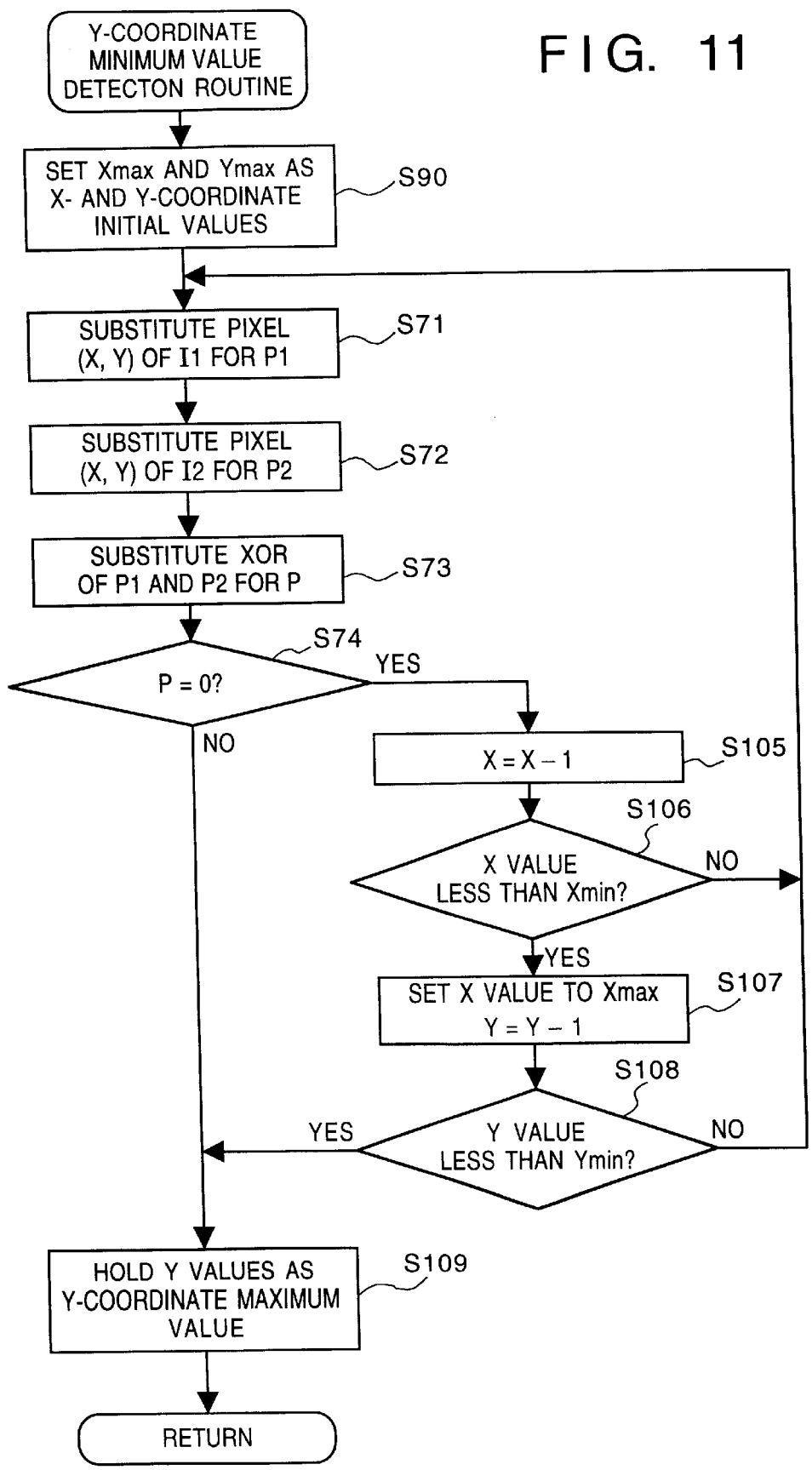
FIG. 11 is a flowchart showing a processing procedure for detecting a Y-coordinate maximum value.

In this manner, by the control as shown in the flowchart of FIG. 8, the X-coordinate minimum value in the changed image area is obtained. Similarly, by the control as shown in the flowchart of FIGS. 9 to 11, the Y-coordinate minimum value, the X-coordinate maximum value and the Y-coordinate maximum value in the image area are obtained.

Figure 7:
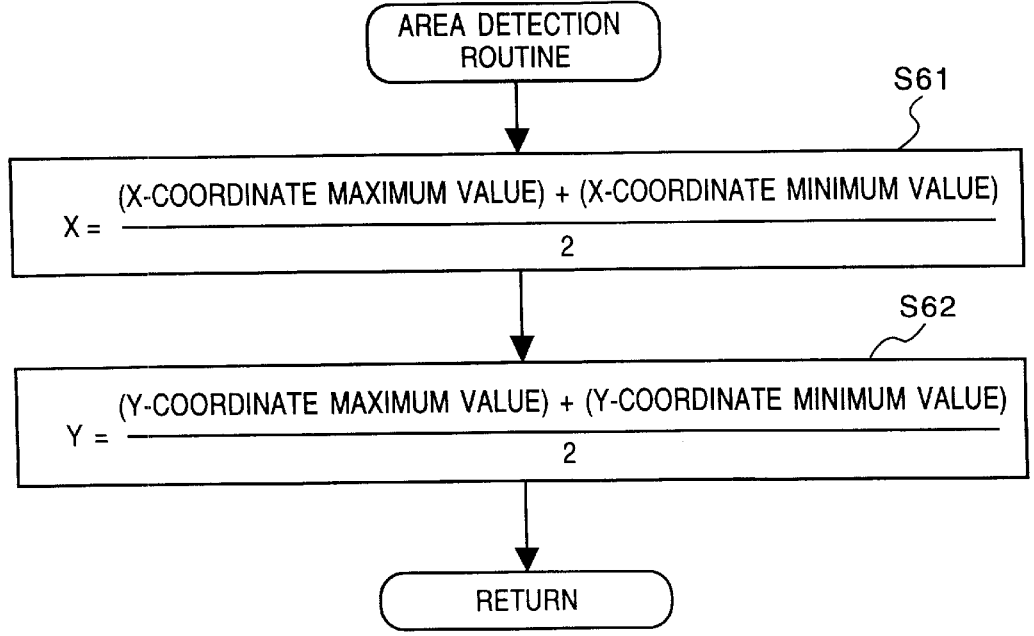
FIG. 7 is a flowchart showing a processing procedure for obtaining central coordinates of the changed image area.

FIG. 7 shows a subroutine for obtaining the central coordinates of the changed image area as the coordinates of the image area where the image has changed. That is, FIG. 7 shows the subroutine activated at step S44 in FIG. 5. The central coordinates are obtained based on the X-coordinate minimum value, the X-coordinate maximum value, the Y-coordinate minimum value and the Y-coordinate maximum value obtained at steps S51 to S54 in FIG. 6, and the obtained central coordinates are returned as (X, Y).

Figure 12:
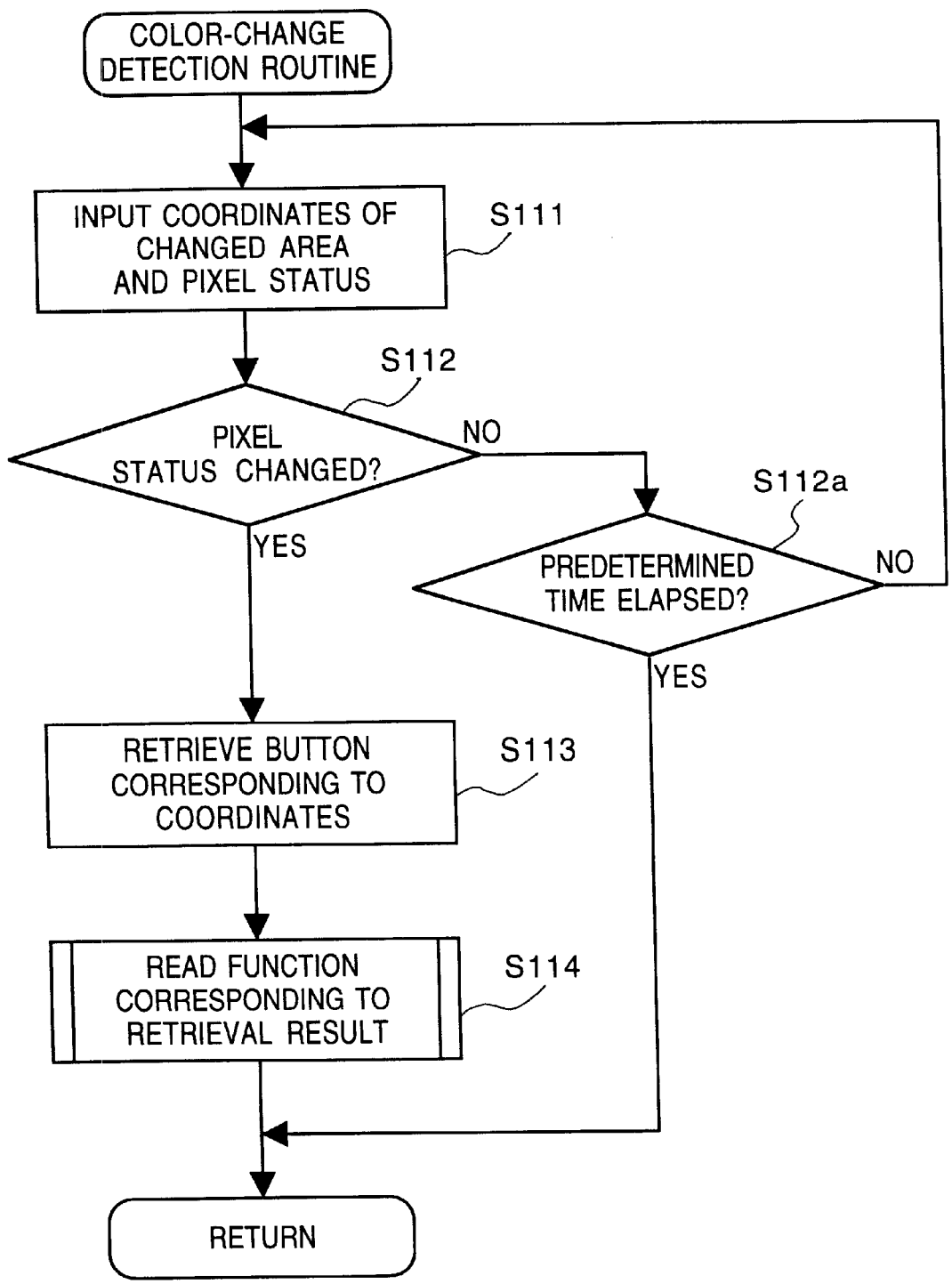
FIG. 12 is a flowchart showing a processing procedure for detecting a color change.

FIG. 12 is a flowchart showing the color-change detection routine executed at step S45 in FIG. 5. At step S111, the coordinates of the changed image area and the pixel status at the coordinates are inputted by the TV camera 11. At step S112, whether or not the pixel status has changed is examined, and if the pixel status has changed (i.e., the color of laser beam has changed), the process proceeds to step S113. At step S113, the function table as shown in FIG. 4 is referred to and a button corresponding to the detected coordinates is retrieved. At step S114, a function corresponding to the retrieval result is read. In this procedure, changeover operation such as change of OHP sheets can be realized.

The detection of pixel status at step S112 is made by detecting whether or not the pixel value of the coordinates, obtained at step S44, of the newly inputted image at step S111, is different from corresponding pixels in the images I1 and I2. Note that if color-change is not detected at step S112, the process proceeds to step S112a. At step S112a, whether or not a predetermined time period has elapsed is determined. If NO, the process returns to step S111 to continue the processing, while if YES, as operation designation has not been made at the coordinates, the process returns to the main routine.

Figure 13:
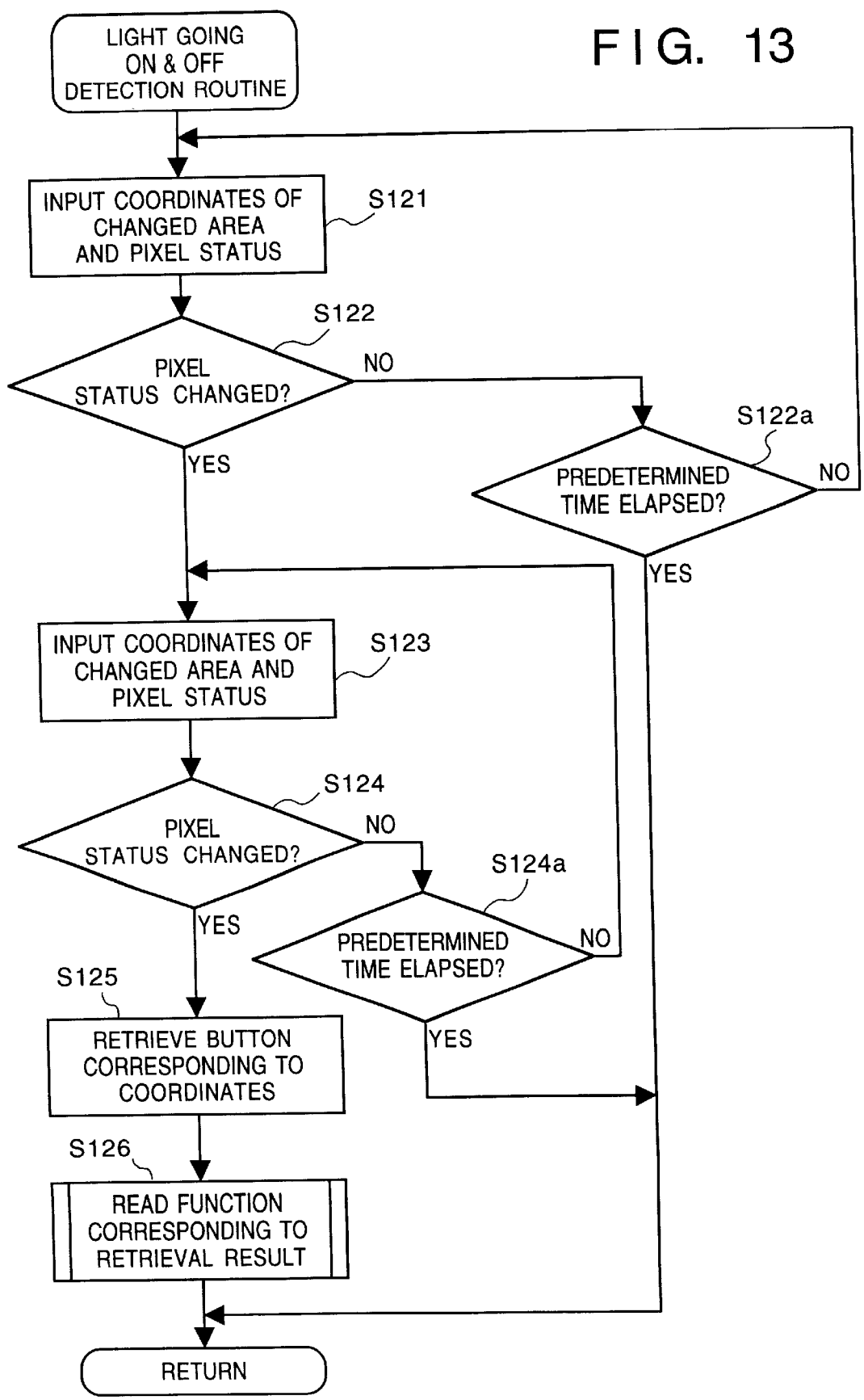
FIG. 13 is a flowchart showing a processing procedure for detecting going on and off of light.

FIG. 13 is a flowchart showing the light-on&off detection routine. At step S121, the coordinates of the changed image area and current pixel status at the coordinates are inputted from the TV camera 11, similar to step S111. At step S122, whether or not the pixel status has changed is examined by comparing the pixel with a corresponding pixel of the image I2. If YES (i.e., the light has gone off), the process proceeds to step S123, while if NO (i.e., the light has been kept turned on), the process proceeds to step S122a to continue the processing. At step S123, the coordinates of the changed image area and the pixel status are again inputted, and at step S124, the pixel status is examined. If the pixel status has changed (i.e., the light has gone on again), as the pixel status is different from the previous status, it is determined that there has been a change at the image area and the processing at step S125 and the subsequent steps is executed. If NO (i.e., the light has been kept tuned off), the process proceeds to step S124a. At steps S125 and S126, the same processing as that in steps S113 and S114 in FIG. 12 is performed. Thus, the above processing realizes designation by going on&off of the laser beam from the laser pointer.

At steps S122a and S124a, whether or not a predetermined time period has elapsed is determined, if NO, the process returns, from step S122a to step S121, and from step S124a to S123. If the predetermined time has elapsed at any of steps S122a and S124a, it is determined that there has been no operation designation, and the process returns to the main routine.

As described above, according to the first embodiment, designation of a position on a displayed image can be made without using a tablet, a large-sized screen coordinate input apparatus can be easily constructed. Further, as color-change or going on&off of laser beam from a laser pointer is detected to recognize a user's intention of designation, the user's designation can be exactly reflected.

[Second Embodiment]

The first embodiment employs a laser pointer to provide a change in the displayed image. In this embodiment, a pointing rod is used in place of the laser pointer 15. That is, in the second embodiment, the CPU 12 detects an end point of a changed image area and determines the coordinates of the end point as a designation position.

Figure 14:
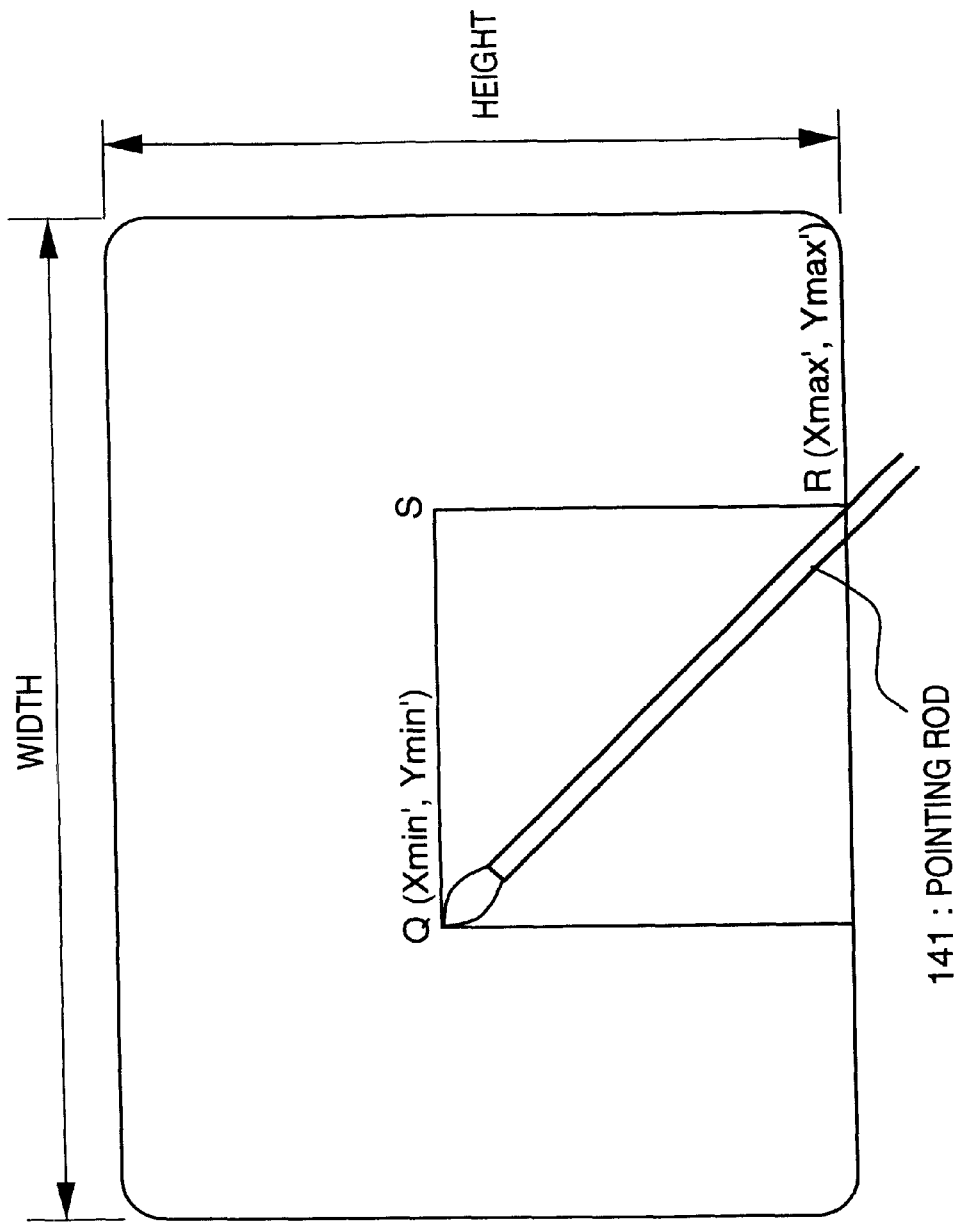
FIG. 14 is an explanatory view of a desired position on a screen pointed by a pointing rod 141.
Figure 15:
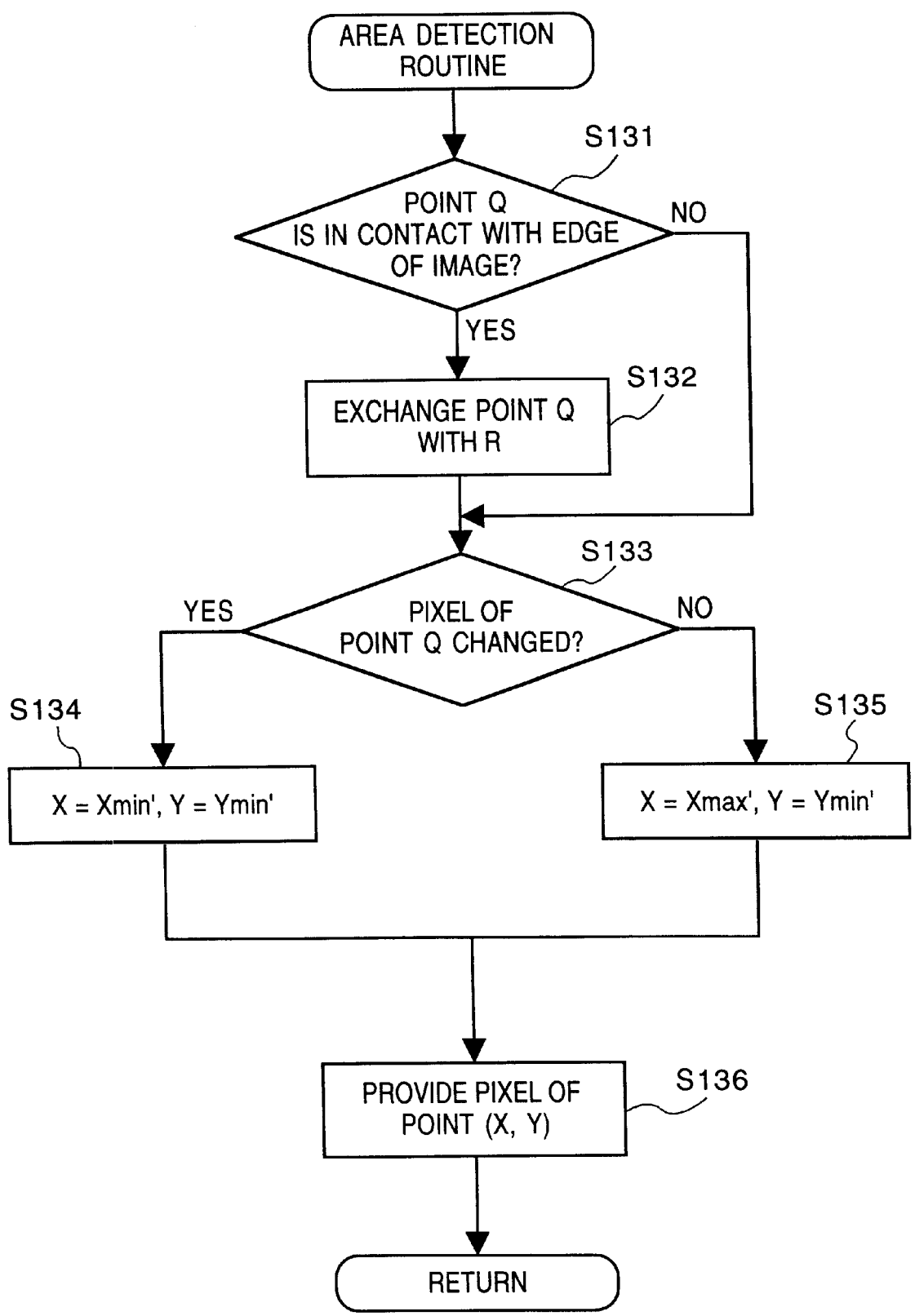
FIG. 15 is a flowchart showing a processing procedure for detecting an end point according to a second embodiment.

FIG. 14 shows an image displayed on the screen and a pointing rod 141 pointing a desired position of the image. FIG. 14 also shows an image inputted by TV camera 11. In this case, the image area changed by being pointed by the pointing rod 141 is detected as a rectangular area having an diagonal line defined by opposite-angle points Q and R ( by the above-described processing in FIG. 6). To obtain designated coordinates, it is necessary to obtain an end point of the pointing rod 141. FIG. 15 is a flowchart showing processing procedure according to the second embodiment for detecting the end point. FIG. 15 is employed in place of the area coordinate detection procedure shown in FIG. 7.

At step S131, which of points Q and R is the end point is determined, based on whether or not the point is in contact with the edge of the displayed image. The point Q has a value (Xmin', Ymin') and the point R has a value (Xmax', Ymax') of the area. "Xmax'", "Ymax'", "Xmin'" and "Ymin'" are respectively the X-coordinate maximum value, the Y-coordinate maximum value, the X-coordinate minimum value and the Y-coordinate minimum value obtained in the processing described in FIG. 6. If the point Q is in contact with the edge of the displayed image, the process proceeds to step S132, to exchange the coordinates of the point Q with those of the point R.

In a case where the pointing rod 141 is inclined at an opposite angle to that in FIG. 14, as a point S is the designated point, the coordinates of the point Q are not used as the end-point coordinates. In this case, at step S133, whether or not the pixel status at the point Q has changed between the images I1 and I2 is examined. If the pixel status at the point Q has changed, it is determined that the end point is the point Q, then the coordinates of the point Q are provided as the end-point coordinates (S134 and S136). On the other hand, if the pixel status at the point Q has not changed, it is determined that the end point is the point S, then the coordinates of the point S are provided as the end-point coordinates (S135 and S136). Thus, the coordinates of the designation by the pointing rod can be detected.

When the laser pointer is used, the user's intention is recognized by detecting going on and off the laser beam (or changing color by laser beam) in the function button area. However, the pointing rod cannot emit light to be turned on and off (or to be changed in color), for this reason, timing of operation intended by the user and the coordinates at the time of the intended operation cannot be detected. Accordingly, when the function button on the displayed image is operated with the pointing rod, designation of the intended operation is made by holding the pointing rod on the function button for a predetermined period. The selected function button is determined by employing the coordinates before the pointing rod is held.

Note that the determination of held status of the pointing rod is made by detecting existence of the tip of the pointing rod within a predetermined coordinate range for a predetermined period or longer. Preferably, the predetermined coordinate range is the position and the size of the function button.

According to the second embodiment, a special operation device such as a laser pointer can be omitted.

As described above, the present invention does not require any screen (digitizer) dedicated for a pointed-position detecting apparatus. This provides movability of apparatus since it is not necessary to carry a large projection board.

Further, the present invention does not require a screen having a specific detection function. When use of a large projection board is considered, the present invention provides a pointed-position detecting apparatus with lower costs, in comparison with conventional art which requires a digitizer with a large detection surface.

Conventionally, since the size of projection screen is fixed, it is difficult to adjust the projection surface size in correspondence with the scale of presentation place. However, the present invention provides a pointed-position detecting apparatus applicable to a presentation place by adjusting the image output means and image input means, thus the apparatus can be widely used.

Furthermore, the present invention uses the image input means, i.e., optical detection means. Even at a distant position from which the presenter cannot use the pointing rod, remote operation designation can be made by using an optical designation means such as a laser pointer.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, CPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS or the like working on the computer performs a part or entire processes in accordance with designations of the program codes and realizes functions according to the above embodiments.

Furthermore, the present invention also includes a case where, after the program codes read from the storage medium are written in a function extension board which is inserted into the computer or in a memory provided in a function extension unit which is connected to the computer, CPU or the like contained in the function extension board or unit performs a part or entire process in accordance with designations of the program codes and realizes functions of the above embodiments.

Figure 17:
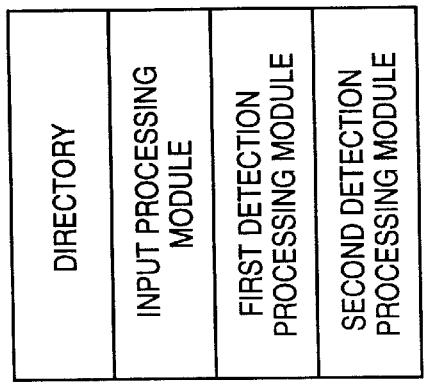
FIG. 17 illustrates a structural feature of a program according to the present invention.

In a case where the present invention is applied to the aforesaid storage medium, the storage medium stores program codes corresponding to the flowcharts described in the embodiments. Briefly, the storage medium stores each module shown as an example of a memory map in FIG. 17. More specifically, program codes which correspond to an input process module, a first detection process module, and a first detection process module, at least, are to be stored in the storage medium.

The input process module is a program module for executing processing for inputting a displayed visible image. The first detection process module is a program module for detecting that the visible image inputted at the input process has been partially changed. The second detection process module is a program module for detecting a designated position in the visible image, based on the partial-change portion of the visible image, detected at the first detection process.

As many apparently widely different embodiments of the present invention can be made without departing from the spirit and scope thereof, it is to be understood that the invention is not limited to the specific embodiments thereof except as defined in the appended claims.

What is claimed is:

1. A pointed-position detecting apparatus comprising:
    input means for inputting a visible image;
    detection means for detecting a changed image area, where the visible image has changed, in the visible imago inputted by said input means;
    obtaining means for obtaining a plurality of corner points of the changed image area; and
    selecting means for selecting a corner point from the plurality of corner points, which is not in contact with an edge of the visible image, as a designation position in the visible image.

2. The pointed-position detecting apparatus according to claim 1, further comprising display means for displaying the visible image.

3. The pointed-position detecting apparatus according to claim 2, wherein said display means displays the visible image in accordance with a projection method.

4. The pointed-position detecting apparatus according to claim 1, wherein said detection means detects the changed image area, changed by pointing to a desired position in the visible image using a pointing rod.

5. The pointed-position detecting apparatus according to claim 4, wherein said obtaining means obtains a tip of the pointing rod included in the changed image area detected by said detection means, as the designation position.

6. The pointed-position detecting apparatus according to claim 1, further comprising memory means for storing the visible image inputted by said input means as an original image, wherein said detection means detects the changed image area by comparing a visible image inputted by said input means with the original image.

7. The pointed-position detecting apparatus according to claim 1, wherein said input means is an image sensing device.

8. The pointed-position detecting apparatus according to claim 1, further comprising:
    monitoring means for monitoring a status of the designation position to determine whether or not the position of the designation position is substantially maintained for a predetermined period; and
    judgement means for judging, when the maintaining of the position is determined by said monitoring means, when to execute a function corresponding to the designation position.

9. The pointed-position detecting apparatus according to claim 1, wherein said selecting means selects a corner point of the changed image area, said corner point not being in contact with an edge of the visible image and a pixel value of said point having been changed before and after the detection of the changed image area.

10. A pointed-position detecting method comprising:
    an input step of inputting a visible image;
    a detection step of detecting a changed image area, where the visible image has changed, in the visible image inputted at said input step;
    an obtaining step of obtaining a plurality of corner points of the changed image area; and
    a selecting step of selecting a corner point from the plurality of corner points, which is not in contact with an edge of the visible image, as a destination position in the visible image.

11. The pointed-position detecting method according to claim 10, further comprising a display step of displaying the visible image.

12. The pointed-position detecting method according to claim 11, wherein at said display step, the visible image is displayed in accordance with a projection method.

13. The pointed-position detecting method according to claim 10, wherein at said detection step, the changed image area, changed by pointing to a desired position in the visible image using a pointing rod, is detected.

14. The pointed-position detecting method according to claim 13, wherein at said obtaining step, a top of the pointing rod included in the changed image area, detected data said detection step, is detected as the designation position.

15. The pointed-position detecting method according to claim 10, further comprising a memory step of storing the visible image inputted at said input step as an original image, wherein at said detection step, the changed image area is detected by comparing a visible image inputted at said input step with the original image.

16. The pointed-position detecting method according to claim 10, wherein at said input step, an image sensing device is employed.

17. The pointed-position detecting method according to claim 10, further comprising:
    a monitoring step of monitoring a status of the designation position to determine whether or not the status of the designation position is maintained for a predetermined period; and a judgment step of judging, when the maintaining of the status is determined in said monitoring step, to execute a function corresponding to the designation position.

18. The pointed-position detecting method according to claim 10, wherein, in said selecting step, a corner point of the changed image area is selected, said corner point not being in contact with an edge of the visible image and a pixel value of said point having been changed before and after the detection of the changed image area.

19. A computer program product comprising a computer usable medium having computer readable program code means embodied in said medium for detecting a pointed position, said product including:

input process procedure codes for inputting a displayed visible image;

detection process procedure codes for detecting a changed image area, where the visible image has changed, in the visible image inputted at said input process;

obtaining process procedure codes for obtaining a plurality of corner points of the changed image area; and selecting process procedure codes for selecting a corner point from the plurality of corner points, which is not in contact with an edge of the visible image, as a designation position in the visible image.

20. The computer program product according to claim 19, further including:

monitoring process procedure codes for monitoring a status of the designation position to determine whether or not the status of the designation position is maintained for a predetermined period; and judgement process procedure code for judging, when the maintaining of the status is determined by said monitoring process, when a function corresponding to the designation position is to be executed.

* * * * *

UNITED STATES PATENT AND TRADEMARK OFFICE
CERTIFICATE OF CORRECTION

PATENT NO. : 6,323,839 B1
DATED : November 27, 2001
INVENTOR(S) : Ryoji Fukuda et al.

It is certified that error appears in the above-identified patent and that said Letters Patent is hereby corrected as shown below:

Column 6,
Line 15, "No," should read -- NO, --.

Column 9,
Line 26, "first" (second occurrence) should read -- second --.
Line 48, "imago" should read -- image --.

Column 12,
Line 17, insert
-- 21. The point-position detecting apparatus according to claim 8, wherein said monitoring means determines the maintaining of status of the designation position when the designation position is within a predetermined coordinate range for the predetermined period.
22. The pointed-position detecting method according to claim 17, wherein, in said monitoring step, the maintaining of the designation position is determined when existence of the designation position is within a predetermined coordinate range for the predetermined period. --.

Signed and Sealed this

Tenth Day of June, 2003

JAMES E. ROGAN
*Director of the United States Patent and Trademark Office*